(12) United States Patent
Cho

(10) Patent No.: US 10,137,427 B2
(45) Date of Patent: Nov. 27, 2018

(54) NANOPARTICLE PREPARATION DEVICE USING LASER

(71) Applicant: SHONANO CO., LTD, Ulsan (KR)

(72) Inventor: Won Il Cho, Busan (KR)

(73) Assignee: SHONANO CO., LTD, Ulsan (KR)

(*) Notice: Subject to any disclaimer, the term of this patent is extended or adjusted under 35 U.S.C. 154(b) by 0 days.

(21) Appl. No.: 15/313,692

(22) PCT Filed: Oct. 15, 2015

(86) PCT No.: PCT/KR2015/010905
§ 371 (c)(1),
(2) Date: Nov. 23, 2016

(87) PCT Pub. No.: WO2016/137082
PCT Pub. Date: Sep. 1, 2016

(65) Prior Publication Data
US 2017/0189888 A1 Jul. 6, 2017

(30) Foreign Application Priority Data
Feb. 27, 2015 (KR) .................. 10-2015-0027893

(51) Int. Cl.
B01J 19/12 (2006.01)
B01D 46/24 (2006.01)
B01D 46/10 (2006.01)
B01D 46/54 (2006.01)
B82B 3/00 (2006.01)

(52) U.S. Cl.
CPC ............ *B01J 19/121* (2013.01); *B01D 46/10* (2013.01); *B01D 46/24* (2013.01); *B01D 46/54* (2013.01); *B82B 3/00* (2013.01); *B01J 2219/0875* (2013.01); *B01J 2219/12* (2013.01)

(58) Field of Classification Search
None
See application file for complete search history.

(56) References Cited

U.S. PATENT DOCUMENTS

2013/0092525 A1* 4/2013 Li .................. B01J 19/088
204/164

FOREIGN PATENT DOCUMENTS

| KR | 10-0840622 A | 6/2008 |
| KR | 20100048501 A | 5/2010 |
| KR | 20110129299 A | 12/2011 |
| KR | 1020120050090 A | 5/2012 |

(Continued)

OTHER PUBLICATIONS

Office Action for Korean, Application No. 10-2015-0027893, dated Apr. 22, 2016.

(Continued)

*Primary Examiner* — Kishor Mayekar
(74) *Attorney, Agent, or Firm* — Novick, Kim & Lee, PLLC

(57) ABSTRACT

The present invention relates to a nanoparticle preparation device using laser, and more particularly, the nanoparticle preparation device using the laser wherein the nanoparticles prepared by irradiating the laser beam to the source material gas within the reaction chamber are recovered without being oxidized by blocking the air or moisture within the glove box in which the nitrogen atmosphere is maintained, and thus the nanoparticles are efficiently collected without oxidation.

3 Claims, 4 Drawing Sheets

(56) References Cited

FOREIGN PATENT DOCUMENTS

| KR | 1291966 A | 8/2013 |
|---|---|---|
| KR | 20130127968 A | 11/2013 |
| KR | 20130130284 A | 12/2013 |
| KR | 10-1363478 | 2/2014 |
| WO | 2012/0006071 A2 | 1/2012 |
| WO | 2016/099022 A1 | 6/2016 |

OTHER PUBLICATIONS

International Search Report for International Application No. PCT/KR2015/010905, dated Jan. 7, 2016.

Kim et al., "High-yield synthesis of single-crystal silicon nanoparticles as anode materials of lithium ion batteries via photosensitizer-assisted laser pyrolysis"; Journal of Materials Chemistry A, pp. 18070-18075, dated Jul. 1, 2014.

Kim et al., "Size tailoring of aqueous germanium nanoparticle Dispersions", Journal of Materials Chemistry A, pp. 10156-10160, dated Mar. 24, 2014.

Nayak et al., Spontaneous formation of nanospiked microstructures in germanium by femtosecond laser irradiation, IOP Publishing, Nanotechnology 18 (2007) 195302 (4pp).

International Search Report, Application No. PCT/KR2015/010902 dated Jan. 7, 2016.

Copending PCT Patent Application, Application No. PCT/KR2015/010902 Published as WO2016/099022.

\* cited by examiner

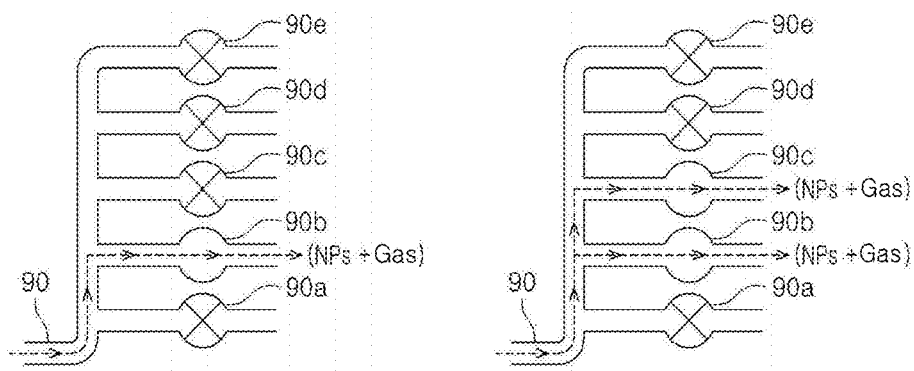
FIG. 6    (A)    (B)
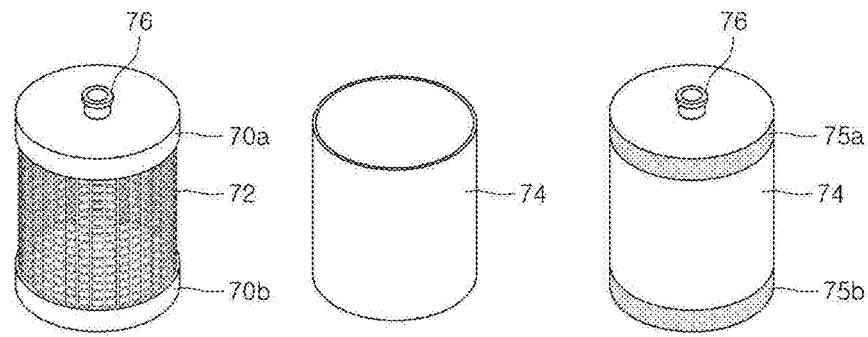
FIG. 7    (A)    (B)    (C)
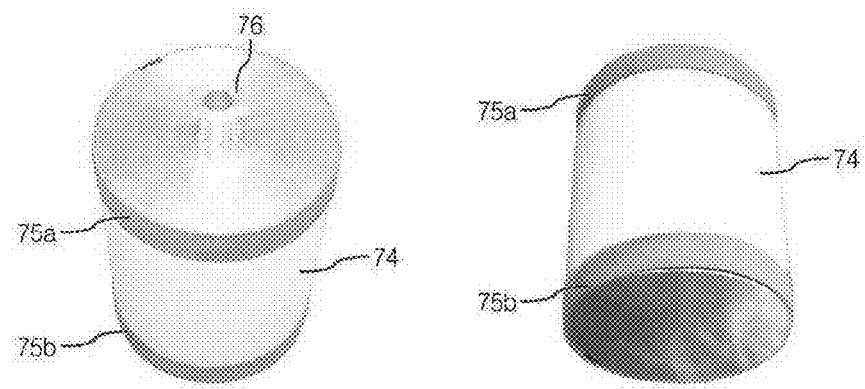
FIG. 8    (A)    (B)

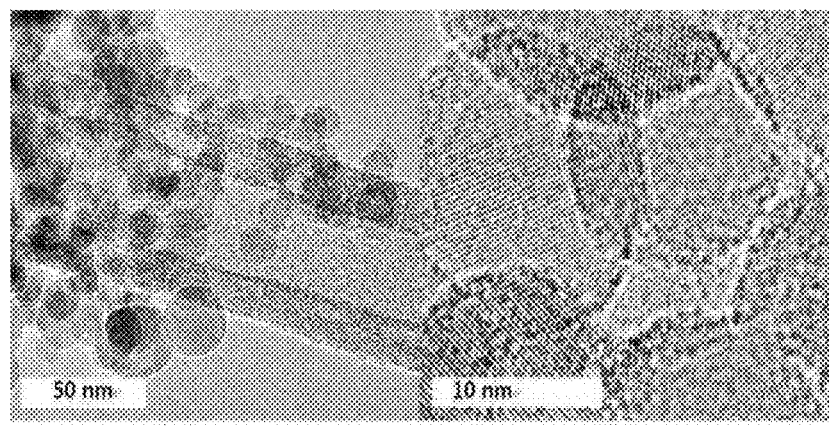
FIG. 9    (A)                                (B)

NANOPARTICLE PREPARATION DEVICE USING LASER

CROSS-REFERENCE TO RELATED APPLICATION

This Application is a Section 371 National Stage Application of International Application No. PCT/KR2015/010905 filed Oct. 15, 2015, and claims priority to Korea Patent Application KR 10-2015-0027893 (filed on Feb. 27, 2015), the contents of which are each hereby incorporated by reference in its entirety.

TECHNICAL FIELD

The present invention relates to a nanoparticle preparation device using laser, and more particularly, the nanoparticle preparation device using the laser wherein the nanoparticles prepared by irradiating the laser beam to the source material gas within the reaction chamber are recovered without being oxidized by blocking the air or moisture within the glove box in which the nitrogen atmosphere is maintained.

BACKGROUND OF THE INVENTION

Recently, the intensive investment is put in the nanotechnology by the companies who have interest in this area. Nanotechnology utilizes the characteristics of the target material brought about by the super refinement, and not only the synthesis but the recovery of nanoparticles is extremely important.

As the preparation method of nanomaterials, there are laser heating method, liquid synthesis method, and solid synthesis method. The liquid synthesis method is basically the batch process and has the difficulties in synthesizing the high purity nanoparticles since the method is necessarily accompanied with making contact with the foreign substances and other various solvents. However, the laser heating method has advantages of making no contact with the impurities and allowing the continuous preparation of nanoparticles.

Referring to the prior arts of the nanoparticle manufacturing equipment by laser heating method, the nanoparticle synthesis equipment using $CO_2$ laser pyrolysis method as shown in FIG. 1 and FIG. 2 (Ref. Kim Sungbeom etc. Korea Materials Society, 23 (2013) 5) comprises laser emitter (10), reaction chamber (20), collector (30), vacuum pump (40), source material supply nozzle (50a) for supplying the source material like monosilane ($SiH_4$) into said reaction chamber (20) and infusion section (55) having carrier gas supply nozzle (50b) for supplying the carrier gas.

Also, Korea publication of unexamined patent applications 10-1291966 (Registered on Jul. 25, 2013). "System for collecting silicon nanoparticles and collection/storage vessel used for the same" provides as shown in FIG. 2, the nanoparticle collection/storage vessel (10) with the nanoparticle inlet (11) placed at one side of same, through which the nanoparticles are infused with the carrier gas, and the filter screen (13) that prevents nanoparticles from being discharged.

On the other hand, since the silicon or germanium nanoparticles prepared by the laser have the very high specific surface area and high reactivity causing oxidation to occur easily, and thus have to be treated carefully.

Accordingly, the nanoparticles as prepared by the systems of the prior arts have the risk of being spoiled by the air contact since they are collected in the space which does not properly block the air.

SUMMARY OF THE INVENTION

Accordingly, the present invention has been made to solve the aforementioned problems occurring in the related art, and it is an object of the present invention to provide a nanoparticle preparation device using a laser wherein the nanoparticles prepared by irradiating the laser beam to the source material gas within the reaction chamber are recovered without being oxidized by blocking the air or moisture within the glove box in which the nitrogen atmosphere is maintained.

Another object is to provide the nanoparticle preparation device using the laser wherein the collector with simple structure is placed within the collecting box so as to efficiently collect the nanoparticles.

TECHNICAL SOLUTION

To achieve the above and other objects, in accordance with an embodiment of the present invention, there is provided the nanoparticle preparation device using the laser comprising a laser emitter (10), a reaction chamber (20) where the nanoparticles are prepared by a laser beam irradiated from said laser emitter (10), and a glove box (30) for collecting the nanoparticles flowed in from said reaction chamber (20).

Within said glove box (30) in provided a collecting box (60) in which a collector (70) is installed with a transfer tube connected for the flow of the nanoparticles and the carrier gas, said collector collecting the nanoparticles filtered by a filter (74) due to the suction by a vacuum pump (40) connected to said collecting box (60).

In addition, said nanoparticle preparation device is provided with a plurality of collectors (70) within the collecting box (60) and a plurality of transfer tubes (90) connected to said collectors (70).

ADVANTAGEOUS EFFECT

According to the embodiment of the present invention having the above-described configuration, the nanoparticles prepared by irradiating the laser beam to the source material gas within the reaction chamber are recovered without being oxidized by blocking the air or moisture within the glove box in which the nitrogen atmosphere is maintained, and the collector structure for separating the nanoparticles is simple and has the effect of efficiently collecting the nanoparticles.

BRIEF DESCRIPTION OF THE DRAWINGS

FIG. 6 shows the transfer tube for supplying the nanoparticles prepared by the present invention into the collector.

FIG. 7 shows the process of assembling the collector of FIG. 4.

FIG. 8 is the photograph of the collector of FIG. 4.

FIG. 9 is the TEM photograph of the silicon nanoparticles collected according to an embodiment of the present invention.

DETAILED DESCRIPTION OF THE INVENTION

Hereinafter, the nanoparticle preparation device using the laser according to the preferred embodiment of the present invention will be described in detail with reference to the accompanying drawings. The contents that a person in the art can easily understand will be abbreviated or omitted and the contents related to the present invention will be described with the drawings.

Figure 1:
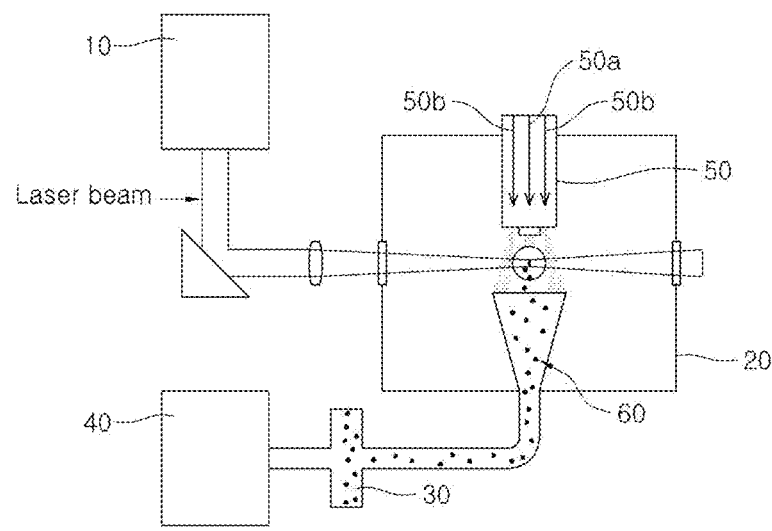
FIG. 1 shows the conventional configuration of the nanoparticle preparation device using the laser.
Figure 2:
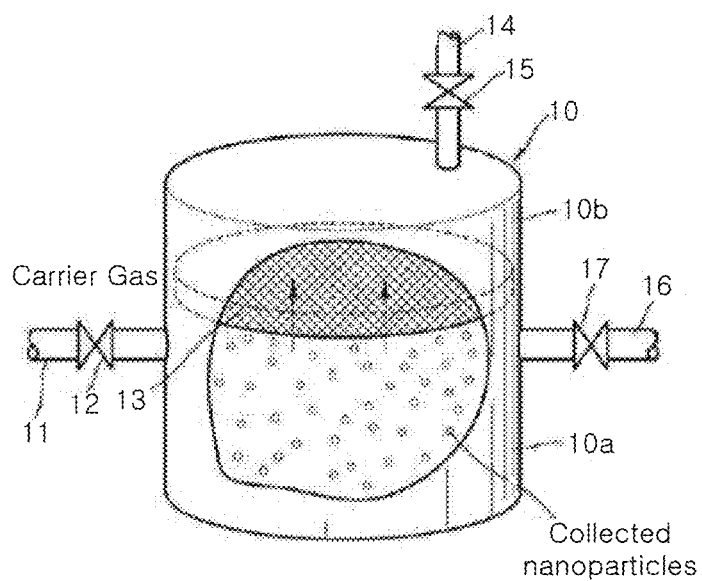
FIG. 2 is the perspective view of the nanoparticle collection/storage vessel of the conventional nanoparticle preparation device.
Figure 3:
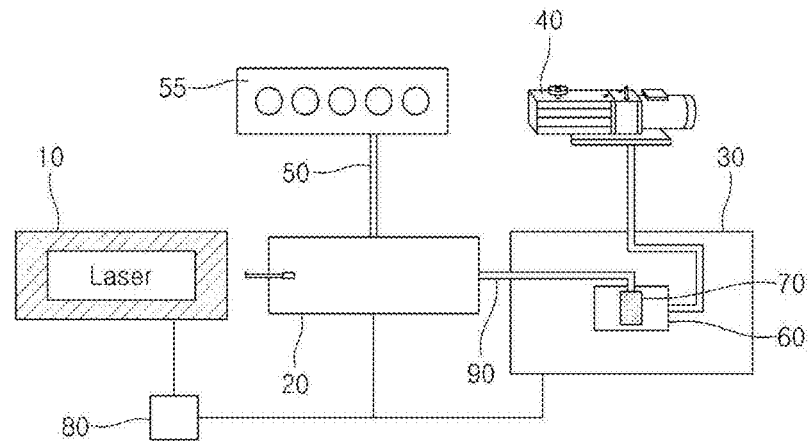
FIG. 3 is the schematic view of the nanoparticle preparation device according to the preferred embodiment according to the present invention.

As shown in FIG. 3, the nanoparticle preparation device using the laser according to the preferred embodiment of the present invention comprises a laser emitter (10), a reaction chamber (20) where the nanoparticles are prepared by a laser beam irradiated from said laser emitter (10), and a glove box (30) for collecting the nanoparticles flowed in from said reaction chamber (20).

The basic principle of the present invention is that the nanoparticle preparation device is configured with the glove box in which the nitrogen atmosphere is maintained in order to block the oxygen or water in the air because the silicon or germanium nanoparticles have the very high specific surface area and so high reactivity causing the oxidation to occur easily.

The laser emitter (10) in the nanoparticle preparation device according to the present invention irradiates the laser generated by the laser generator into the source material gas infused into the reaction chamber (20) and decomposes the source gas.

Said laser beam is generated by $CO_2$ laser, and the laser wavelength may be different depending on the source gas to be used, but is typically 10.6 µm, which is irradiated in the form of the continuous laser beam.

The $CO_2$ laser generator used in the present invention has any industrial high power output among the maximum powers of 60 W, 120 W, 300 W, 600 W, 1,000 W, 2,000 W, 3,000 W, 4,000 W, 6,000 W, etc., and can be chosen depending on the amount to be produced. The source material gas such as monosilane ($SiH_4$) or tetra-methyl germanium [$Ge(CH_3)$] stored in the gas cylinder (50) is infused into the reaction chamber (20) with the carrier gas such as nitrogen or helium, which is then decomposed by the laser irradiated by the laser emitter (10) and changes to the nanoparticles.

The reaction chamber (20) in the present invention has the internal pressure of typically 100-500 torr. If the internal pressure is below the certain range, the decomposition of the source gas does not occur and the yield is decreased, whereas if the internal pressure is exceeds the certain range, the quality can be degraded as the nanoparticles are agglomerated.

As shown in FIG. 3, when the source gas stored in the gas cylinder (50) is supplied with the carrier gas into the reaction chamber (20), and the laser with the $CO_2$ laser wavelength that is matched well with the absorption region of the source material gas such as monosilane ($SiH_4$) and tetra-methyl germanium [$Ge(CH_3)$] is irradiated, the laser energy is readily absorbed exciting the molecules such as monosilane or tetra-methyl germanium, decomposes Si—H and Ge—$CH_3$ bonds due to the strong vibration of the molecules and thereby generates the silicon or germanium radicals. The silicon or germanium radicals thus generated develop into the nuclei of the silicon nanoparticle or the nuclei of the germanium nanoparticle by the homogenous nucleation, and grow by combining the surrounding silicon or germanium radicals to produce the nanoparticles (hereinafter NPs).

Therefore, the surrounding condition of the silicon or germanium radicals and the duration time for which the nuclei of silicon nanoparticle or the nuclei of germanium nanoparticle stay in the reaction region are the important factors in controlling the size and property of Si-NPs or Ge-NPs.

Said source material gas could be any substance that can produce nanoparticles as the source gas is decomposed and reacted by the application of the laser energy. Specifically, said source material gas may comprise at least one of silicon compound or germanium compound, indium compound and gallium compound.

Said carrier gas may be selected from at least one of nitrogen, argon, and helium.

The source material gas and carrier gas are not limited to the compounds aforementioned, and could be any compound that can be decomposed by the laser heat.

Figure 4:
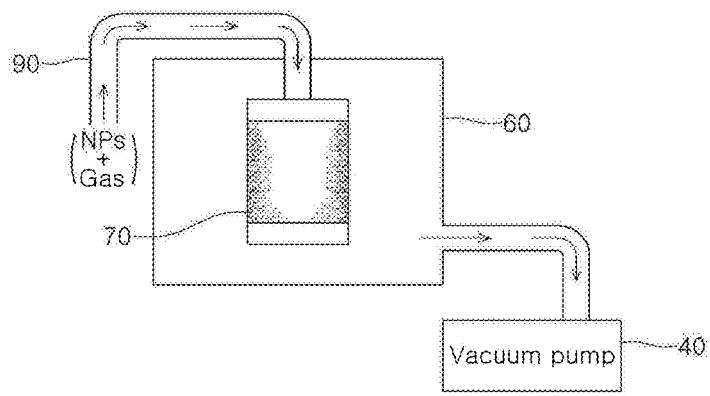
FIG. 4 is the drawing showing the collector installed within the collecting box provided in the glove box of the nanoparticle preparation device according to the present invention.

On the other hand, the glove box (30) according to the present invention, as shown in FIGS. 3 and 4, is provided with the collecting box (60) in which the collector (70) is installed with a transfer tube connected for the flow of the nanoparticles and the carrier gas, said collector (70) collecting the nanoparticles filtered by the filter (74) due to the suction by the vacuum pump (40) through the suction tube (45) connected to the collecting box (60).

As shown in FIG. 7(A), said collector (70) is assembled into one body by a plurality of grid frames (72) between the upper cap (70a) and the lower cap (70b), and as shown in FIG. 7(B), the filter (74) is covered to the outside of said plurality of grid frames (72). And, as shown in FIG. 7(C), the filter (74) is fixed by the upper band (75a) and the lower band (75b), said upper cap (70a) having a discharge section (76) at the center of the same for discharging the carrier gas.

Said grid frame (72) acts as a support not to damage the filter (74) on the suction of the carrier gas by the vacuum pump (40), and the shape of the grid frame is not specifically defined.

The collector (70) could be made of the various shapes such as the cylindrical or rectangular shape, and also the band and the filter could be made of the various materials within the scope of the present invention.

The NPs produced in the reaction chamber (20) with the carrier gas is delivered to the collecting box (60) through the transfer tube (90) by the suction force by the vacuum pump (40), only the carrier gas is filtered through the filter (74) and discharged to the outside, and the NPs not filtered are accumulated within the collecting box (60).

The inside of the glove box (30) is maintained in the nitrogen atmosphere so as to prevent the nanoparticles collected from being oxidized due to air or moisture.

The nanoparticle preparation device comprising the aforementioned elements according to the preferred embodiment of the present invention is controlled automatically by the controller (80) for controlling the laser emitting condition, reaction chamber condition, etc.

Figure 5:
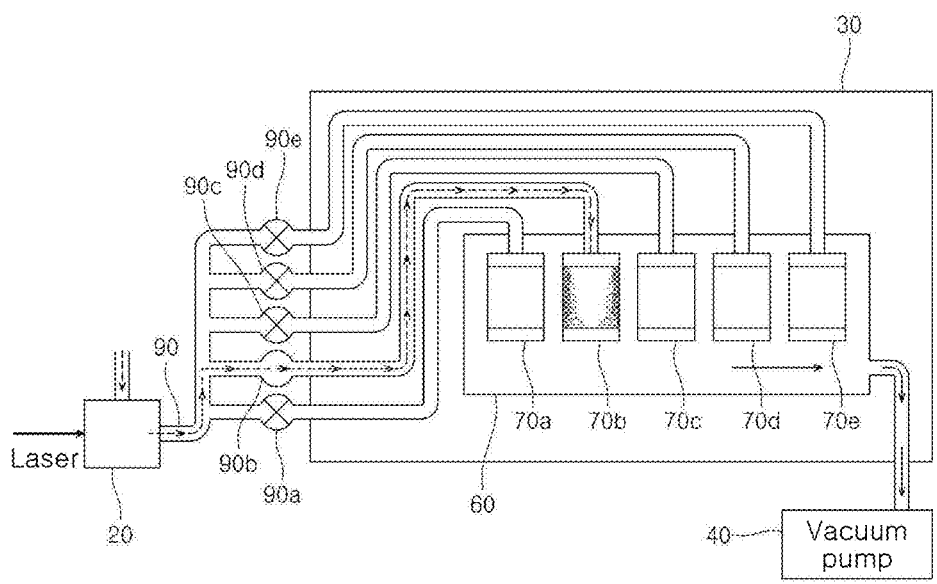
FIG. 5 shows a plurality of collectors installed within the collector box of FIG. 4.

Moreover, the nanoparticle preparation device of the present invention may, if necessary, include as shown in FIGS. 5 and 6, a plurality of collectors (70a, 70b, 70c, 79d, 70e) with a plurality of transfer tubes connected to said collector (70), respectively, and the number of collectors may be adjusted depending on the device scale or the amount of nanoparticles produced. Also, as shown in FIG. 6, by adjusting the valves (90a, 90b, 90c, 90d, 90e) installed on the respective transfer tubes, the separate nanoparticles can be collected in the respective collectors (70a, 70b, 70c, 79d, 70e). FIG. 6(A) shows the passing of the NPs and carrier gas with only valve 90b open, and FIG. 6(B) shows the passing of the NPs and carrier gas with the valves 90b and 90c open at the same time.

FIG. 7 shows the process of assembling the collector of FIG. 4, and FIG. 8 is the photograph of the collector of FIG. 4.

Hereinafter, the operation of the nanoparticle preparation device using the laser according to the present invention will be specifically described, and technical elements are not necessarily limited to the description below.

Hereinafter the unit, sccm (standard cubic centimeters per minute) indicates the flux unit used in the present invention.

According to the preferred embodiment of the present invention, the source material gas ($SiH_4$) of 25 sccm and the carrier gas (He) of 100 sccm are supplied through the supply nozzle (50a) into the reaction chamber (20) having the internal pressure of 100 torr. Into the mixture gas is irradiated for 1 hour the continuous laser beam having wavelength of 10.6 μm emitted by the $CO_2$ laser generator. Then, the Si—H bonds are decomposed due to the strong vibration of the molecules and thereby the silicon radicals are generated. The silicon radicals thus generated develop into the nuclei of the silicon nanoparticle by the homogenous nucleation, and grow by combining the surrounding silicon radicals to produce the nanoparticles.

Si-NPs are sucked by the vacuum pump (40), collected in the collector (70), and wrapped in the vacuum vessel.

FIG. 9A is the TEM photograph of the silicon nanoparticles collected according to said embodiment, and FIG. 9B is the enlarged one. It can be shown that the Si-NPs are spherical and have the crystallinity well exhibiting the atomic grid patterns.

Although the present invention has been described with reference to the preferred embodiment in the attached figures, it is to be understood that various equivalent modifications and variations of the embodiments can be made by a person having an ordinary skill in the art without departing from the spirit and scope of the present invention as recited in the claims.

Preferred Embodiment

According the preferred embodiment of the present invention, the nanoparticle preparation device using the laser comprises a laser emitter (10), a reaction chamber (20) where the nanoparticles are prepared by a laser beam irradiated from said laser emitter (10), and a glove box (30) for collecting the nanoparticles flowed in from said reaction chamber (20). Within said glove box (30) in provided a collecting box (60) in which a collector (70) is installed with a transfer tube connected for the flow of the nanoparticles and the carrier gas, said collector (70) collecting the nanoparticles filtered by a filter (74) due to the suction by a vacuum pump (40) connected to said collecting box (60). In addition, said nanoparticle preparation device is provided with a plurality of collectors (70) within the collecting box (60) and a plurality of transfer tubes (90) connected with said collectors (70).

INDUSTRIAL APPLICABILITY

According to the present invention having the above-described configuration, the nanoparticles prepared by irradiating the laser beam to the source material gas within the reaction chamber are recovered without being oxidized by blocking the air or moisture within the glove box in which the nitrogen atmosphere is maintained, and the collector structure for separating the nanoparticles is simple and has the effect of efficiently collecting the nanoparticles.

What is claimed is:

1. A nanoparticle preparation device using laser, comprising;
   a laser emitter;
   a reaction chamber where nanoparticles are prepared by a laser beam irradiated from said laser emitter to a source material gas;
   a glove box for collecting the nanoparticles flowed in from said reaction chamber, the glove box including:
      a collecting box disposed inside the glove box; and
      a collector for collecting the nanoparticles, disposed inside the collecting box, and including an upper cap, a lower cap, a plurality of grid frames disposed between the upper and lower caps, and a filter covering outside surfaces of the plurality of grid frames; and
   a transfer tube connected to the reaction chamber and the collector for a flow of the nanoparticles and a carrier gas.

2. The nanoparticle preparation device of claim 1, wherein said collector collects the nanoparticles filtered by the filter due to a suction by a vacuum pump connected to said collecting box.

3. The nanoparticle preparation device of claim 1, wherein said nanoparticle preparation device is provided with a plurality of collectors within the collecting box and a plurality of transfer tubes connected to said collectors, respectively.

* * * * *